(12) United States Patent
Schmidt et al.

(10) Patent No.: US 9,015,845 B2
(45) Date of Patent: Apr. 21, 2015

(54) TRANSIT CONTROL FOR DATA

(71) Applicant: Samsung SDS Co., Ltd., Seoul (KR)

(72) Inventors: Andreas Schmidt, Frankfurt (DE); Andreas Leicher, Frankfurt (DE); Lakshmi Subramanian, Karlsruhe (DE); Won Young Kim, Seoul (KR); Inhyok Cha, Seoul (KR); Ji Yeon Choi, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 172 days.

(21) Appl. No.: 13/664,112

(22) Filed: Oct. 30, 2012

(65) Prior Publication Data

US 2014/0123292 A1    May 1, 2014

(51) Int. Cl.
*G06F 11/00* (2006.01)
*H04L 29/08* (2006.01)

(52) U.S. Cl.
CPC ..................... *H04L 67/10* (2013.01)

(58) Field of Classification Search
CPC .............. G06F 21/577; H04L 63/1433; H04L 63/1416
USPC ..................................... 726/250, 25
See application file for complete search history.

(56) References Cited

U.S. PATENT DOCUMENTS

| | | | |
|---|---|---|---|
| 8,332,914 B2* | 12/2012 | Buddhikot et al. | 726/4 |
| 8,341,427 B2* | 12/2012 | Auradkar et al. | 713/192 |
| 2012/0131341 A1* | 5/2012 | Mane et al. | 713/168 |
| 2012/0260156 A1* | 10/2012 | Tsao et al. | 715/234 |
| 2013/0111547 A1* | 5/2013 | Kraemer | 726/1 |
| 2013/0211555 A1* | 8/2013 | Lawson et al. | 700/28 |

* cited by examiner

*Primary Examiner* — Teshome Hailu
(74) *Attorney, Agent, or Firm* — Sughrue Mion, PLLC

(57) ABSTRACT

A method for an apparatus which operates in a data cloud includes requesting trust information from a service cloud, receiving the trust information from the service cloud, performing a trust assessment of the service cloud based on the trust information, and controlling transmission of data to the service cloud according to a result of the trust assessment.

17 Claims, 8 Drawing Sheets

TRANSIT CONTROL FOR DATA

BACKGROUND

Apparatuses, methods, systems, and computer program products consistent with exemplary embodiments relate to cloud computing, and more particularly, to enabling secure inter-cloud data transfer.

Recently, cloud computing technology has been developed as a useful way for individuals and businesses to store and transfer data across networks, such as the Internet. In the cloud environments, protection and security of data is of prime importance for data owners. However, it can be difficult to protect data which is stored in a cloud system, because the data storage facilities of the cloud system are typically located in remote locations far away from the data owners.

The difficulty of protecting data in a cloud environment becomes even greater when a data owner wishes to transfer data from one cloud system to another cloud system. For example, an organization which is a data owner may use a private cloud system, a virtual private cloud system, and a public cloud system concurrently. The business processes of the organization might involve data transfer between these different types of clouds. Furthermore, a data owner may desire to use a service to analyze the data owner's data, where the service is located in a cloud system (a service cloud) that is separate from the cloud system which stores the data owner's data (a data cloud). In this case, the data owner may wish to temporarily provide the data stored in the data cloud to the service cloud in order to use the service provided by the service cloud. Such an inter-cloud data transfer further reduces the data owner's control and visibility of the data.

Related art cloud security solutions concentrate on various sub-components of the cloud environment. However, these related art cloud security solutions only attempt to secure one end of communication (e.g., data cloud), which is not enough to ensure security considering that the other communicating entity (e.g., service cloud) may be vulnerable to attacks. A process to evaluate the security and trustworthiness of the target cloud system to which data is to be sent does not exist in the related art cloud security solutions.

Accordingly, there is a need in the art to provide a technique which is capable of evaluating the security and trustworthiness of a target cloud system involved in an inter-cloud data transfer, thereby enabling a more secure inter-cloud data transfer.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

Exemplary embodiments relate to methods and apparatuses to enable secure inter-cloud data transfer by performing a trust evaluation of a target service in a target cloud system.

Exemplary embodiments further relate to methods and apparatuses to enable secure inter-cloud data transfer by providing data from a data cloud system to a target cloud system on a minimal, need to know basis.

Therefore, as part of the transit control framework, a mechanism to perform a trust evaluation of a target cloud system and data filtering before data is sent from one cloud to another is proposed.

According to an exemplary embodiment, there is provided a method for an apparatus which operates in a data cloud, the method including: requesting trust information from a service cloud; receiving the trust information from the service cloud; performing a trust assessment of the service cloud based on the trust information; and controlling transmission of data to the service cloud according to a result of the trust assessment.

The method may further include transmitting the data to the service cloud when the result of the trust assessment indicates that the service cloud is trustworthy, the data to be used with the target service provided by the service cloud.

The data cloud may include a data trust application programming interface (API), and the requesting of the trust information may include the data trust API requesting the trust information from a service trust API of the service cloud.

The method may further include the data trust API requesting service description information from the service trust API, the service description information describing the target service.

The method may further include receiving, by the data trust API, the service description information from the service trust API.

The service trust API may retrieve the service description information from a service description database which operates in the service cloud.

The method may further include the data trust API transmitting a request to a Target System Security Posture Retrieval (TSSPR) host agent (HA) which operates in the data cloud to identify a security parameter to be used for performing the trust assessment of the service cloud, the request being based on the service description information.

The security parameter may include at least one type of information selected from among information related to an antivirus system implemented by the service cloud, information related to a log file implemented by the service cloud, and information related to at least one of a platform and an operating system (OS) implemented by the service cloud.

The information related to the platform may include at least one of information related to hardware configuration information, server information, networking information, and storage information.

The requesting of the trust information may include transmitting the security parameter to the service trust API, the security parameter being used by the service trust API to request a TSSPR remote agent (RA) which operates in the service cloud to initiate a security data compiler for gathering information related to the security parameter.

The receiving of the trust information may include the data trust API receiving the information related to the security parameter from the service trust API; and the performing of the trust assessment may include the data trust API requesting the TSSPR HA to initiate a trust verifier based on the information related to the security parameter, to thereby start the trust assessment.

The method may further include the data trust API instructing a view filter server residing in the data cloud to create a filter rule when the trust verifier indicates that the service cloud is trustworthy.

The view filter server may dynamically create the filter rule to filter the data.

The view filter server may create the filter rule based on information related to a policy.

The method may further include the view filter server obtaining the information related to the policy from a policy database.

The view filter server may further create the filter rule based on metadata associated with the data.

The method may further include filtering the data using the filter rule; and directly transmitting the filtered data to the service cloud, the filtered data to be used with the target service of the service cloud.

The method may further include filtering the data using the filter rule; and providing a URL to the service cloud to enable the service cloud to access the filtered data via the URL, the filtered data to be used with the target service of the service cloud.

The view filter server may create a plurality of the filter rules which are a combination of atomic filter rules and categorized filter rules.

The atomic filter rules may include ADD, REPLACE, or REMOVE rules which respectively add, replace or remove designated types of information from the data.

The categorized filter rules may be created based on policies.

The data trust API may include a plurality of layers, and the method may further include the data trust API requesting the TSSPR HA to identify a plurality of the security parameters corresponding to the plurality of layers.

The plurality of layers may further include: an infrastructure as a service (IaaS) layer; a platform as a service (PaaS) layer; and a software as a service (SaaS) layer.

The requesting of the trust information from the service cloud, the receiving of the trust information from the service cloud, and the performing of the trust assessment of the service cloud based on the trust information may be performed via a third party trust orchestrator.

A user may have a first service level agreement (SLA) with the data cloud and a second SLA with the service cloud.

According to another exemplary embodiment, a method to be performed by an apparatus which operates in a service cloud which provides a target service requested by a user, the method being used to receive data of the user stored in a data cloud, includes: receiving a request for trust information from the data cloud; transmitting the trust information to the data cloud; and receiving the data from the data cloud according to a result of a trust assessment performed by the data cloud based on the trust information.

According to another exemplary embodiment, a data trust application programming interface (API) server includes: a processor; a storage; and an input/output unit, the storage storing instructions that enable the processor to carry out operations including: requesting, via the input/output unit, trust information from a service cloud which provides a target service requested by a user; receiving, via the input/output unit, the trust information from the service cloud; performing a trust assessment of the service cloud based on the trust information; and controlling transmission of data to the service cloud, via the input/output unit, according to a result of the trust assessment.

According to another exemplary embodiment, a service trust application programming interface (API) server includes: a processor; a storage; and an input/output unit, the storage storing instructions that enable the processor to carry out operations including: receiving, via the input/output unit, a request for trust information from a data cloud; transmitting the trust information to the data cloud; and receiving data from the data cloud according to a result of a trust assessment performed by the data cloud based on the trust information, the received data to be used with a target service stored in a service cloud.

According to another exemplary embodiment, a view filter server includes: a processor; a storage; and an input/output unit, the storage storing instructions that enable the processor to carry out operations including: receiving, via the input/ output unit, an indication indicating whether a service cloud is trustworthy; and if the indication indicates that the service cloud is trustworthy, creating a filter rule to filter data of a user stored in a data cloud; filtering the data using the filter rule; and transmitting, via the input/output unit, the filtered data.

According to another exemplary embodiment, a trust verifier includes: a processor; a storage; and an input/output unit, the storage storing instructions that enable the processor to carry out operations including: receiving, via the input/output unit, information related to a security parameter of a service cloud; performing a trust assessment of whether the service cloud is trustworthy based on the information; and transmitting an indication of a result of the trust assessment to a view filter server, to be used by the view filter server to determine whether to create a filter rule to filter data stored in a data cloud.

According to another exemplary embodiment, a security data compiler includes: a processor; a storage; and an input/ output unit, the storage storing instructions that enable the processor to carry out operations including: receiving, via the input/output unit, a request from a Target System Security Posture Retrieval (TSSPR) Remote Agent (RA), requesting that the security data compiler gather information related to a security parameter of a service cloud; gathering the requested information; and transmitting, via the input/output unit, the requested information to the TSSPR RA to enable the TSSPR RA to transmit the requested information to a data cloud.

According to another exemplary embodiment, a Target System Security Posture Retrieval (TSSPR) Host Agent (HA) includes: a processor; a storage; and an input/output unit, the storage storing instructions that enable the processor to carry out operations including: receiving, via the input/output unit, a request from a data trust application programming interface (API) server requesting identification of a security parameter to be used for performing a trust assessment of a service cloud; identifying the security parameter; and transmitting, via the input/output unit, the identified security parameter to the data trust API server.

According to another exemplary embodiment, a Target System Security Posture Retrieval (TSSPR) Remote Agent (RA) includes: a processor; a storage; and an input/output unit, the storage storing instructions that enable the processor to carry out operations including: receiving, via the input/ output unit, a request from a service trust application programming interface (API) server requesting initiation of a security data compiler for gathering information related to a security parameter; initiating the security data compiler; receiving, via the input/output unit, information gathered by the security data compiler; and transmitting, via the input/ output unit, the information gathered by the security data compiler to the service trust API server.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Exemplary embodiments enable secure inter-cloud data transfer by performing a trust evaluation of a target service and then providing required data to the target service on a minimal, need-to-know-basis. To achieve this, exemplary embodiments provide a technique in which certain security information is gathered at the target service platform and additional processing is performed in the data cloud that hosts user data. Therefore, both of the cloud systems are actively involved in ensuring a secure inter-cloud data transfer.

Figure 1:
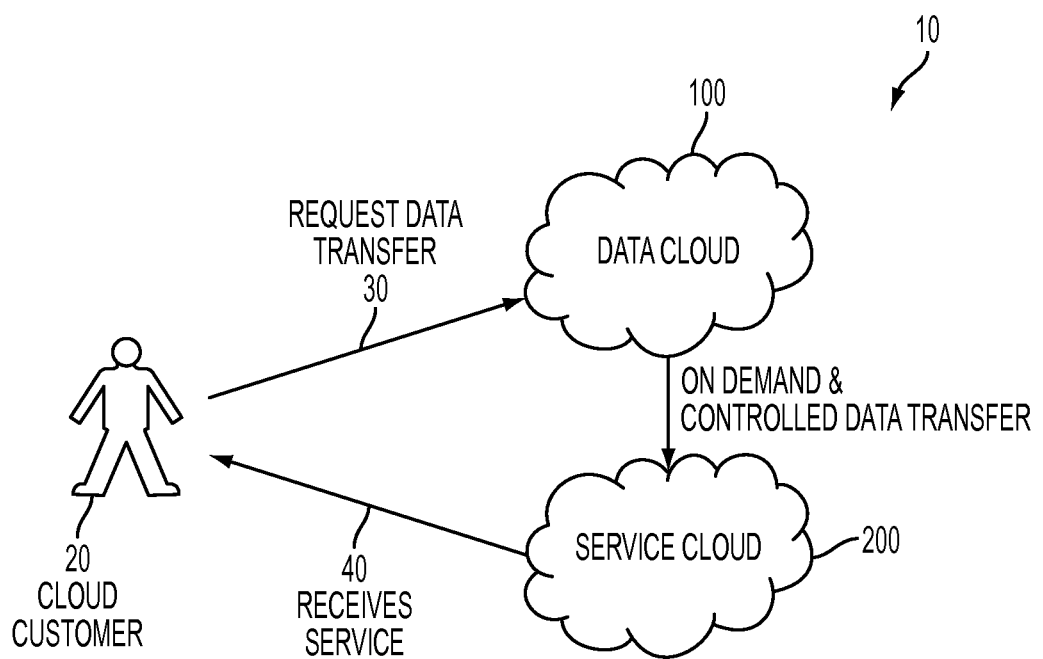
FIG. 1 illustrates a cloud computing system according to an exemplary embodiment.

FIG. 1 illustrates a cloud computing system according to an exemplary embodiment. As shown in FIG. 1, the cloud computing system 10 includes a cloud customer 20, a data cloud system 100 (also referred to hereinafter as a "data cloud 100"), and a service cloud system 200 (also referred to hereinafter as a "service cloud 200"). The cloud customer 20 is connected to the data cloud 100 though a connection 30. The cloud customer 20 is connected to the service cloud 200 through a connection 40. The data cloud 100 is connected to the service cloud 200 through a connection 50.

In an exemplary embodiment, the cloud customer 20 is one of an individual user or a corporate entity, such as an Enterprise entity. For example, the cloud customer 20 can be an individual data owner that stores his/her data in the data cloud 100. Alternatively, the cloud customer 20 can be a corporate entity such as, for example, a health insurance company which maintains medical records in the data cloud 100. The cloud customer 20 may access the data cloud 100 and service cloud 200 in various ways, for example, through a World Wide Web (WWW) interface.

When the cloud customer 20 is an individual Internet user, the cloud customer 20 may access the data stored in the data cloud 100 and the services provided by the service cloud 200 through a user interface (e.g. WWW interface) provided on a personal electronic device of the user, such as a desktop computer, a laptop computer, a mobile phone, etc.

When the cloud customer 20 is a corporate entity, such as an Enterprise entity, the cloud customer 20 may access the data stored in the data cloud 100 and the services provided by the service cloud 200 through a cloud provider interface accessible from a client computer or through a cloud broker interface. Access can also be provided in many other ways, according to the requirements of the Enterprise entity.

In an exemplary embodiment, the data cloud 100, the service cloud 200, or a third-party entity may perform a verification procedure on the device of the cloud customer 20 to verify the identity of the cloud customer 20 requesting the inter-cloud data transfer. The verification may be performed using many different techniques, for example, inputting passwords, etc.

According to an exemplary embodiment, the cloud customer 20 and the data cloud 100 (via a representative of the data cloud 100) enter into an agreement whereby the cloud customer 200 is granted access to use the data storage services offered by the data cloud 100. The agreement may be, for example, a Service Level Agreement (SLA). The SLA may have various different types of provisions. For example, the SLA may authorize the cloud customer 20 to store data in storage facilities owned or operated by the representative of the cloud customer 20, in exchange for a fee.

The cloud customer 20 accesses the data cloud 100 through the connection 30. In an exemplary embodiment, the connection 30 is established over the Internet using wired and/or wireless connection devices. The cloud customer 20 can transmit and/or receive data to and/or from the storage facilities of the data cloud 100 via the connection 30.

According to an exemplary embodiment, the cloud customer 20 and the service cloud 200 (via a representative of the service cloud 200) enter into an agreement whereby the cloud customer 200 is granted access to use the services offered by the service cloud 200. For example, the cloud customer 20 and the representative of the service cloud 200 may enter into a Service Level Agreement (SLA). The SLA may have various different types of provisions. For example, the SLA may authorize the cloud customer 20 to use various services provided by the service cloud 200, in exchange for a fee.

The cloud customer 20 accesses the service cloud 200 through a connection 40. In an exemplary embodiment, the connection 30 is established over the Internet using wired and/or wireless connection devices. The cloud customer 20 can requests services to be performed by the service cloud via the connection 30, and can further receive results of the service via the connection 30.

The data cloud 100 and the service cloud 200 communicate with each other over a connection 50. In an exemplary embodiment, the connection 30 is established over the Internet using wired and/or wireless connection devices. The data cloud 100 and the service cloud 200 communicate with each other and exchange requested information over the connection 50.

Figure 2:
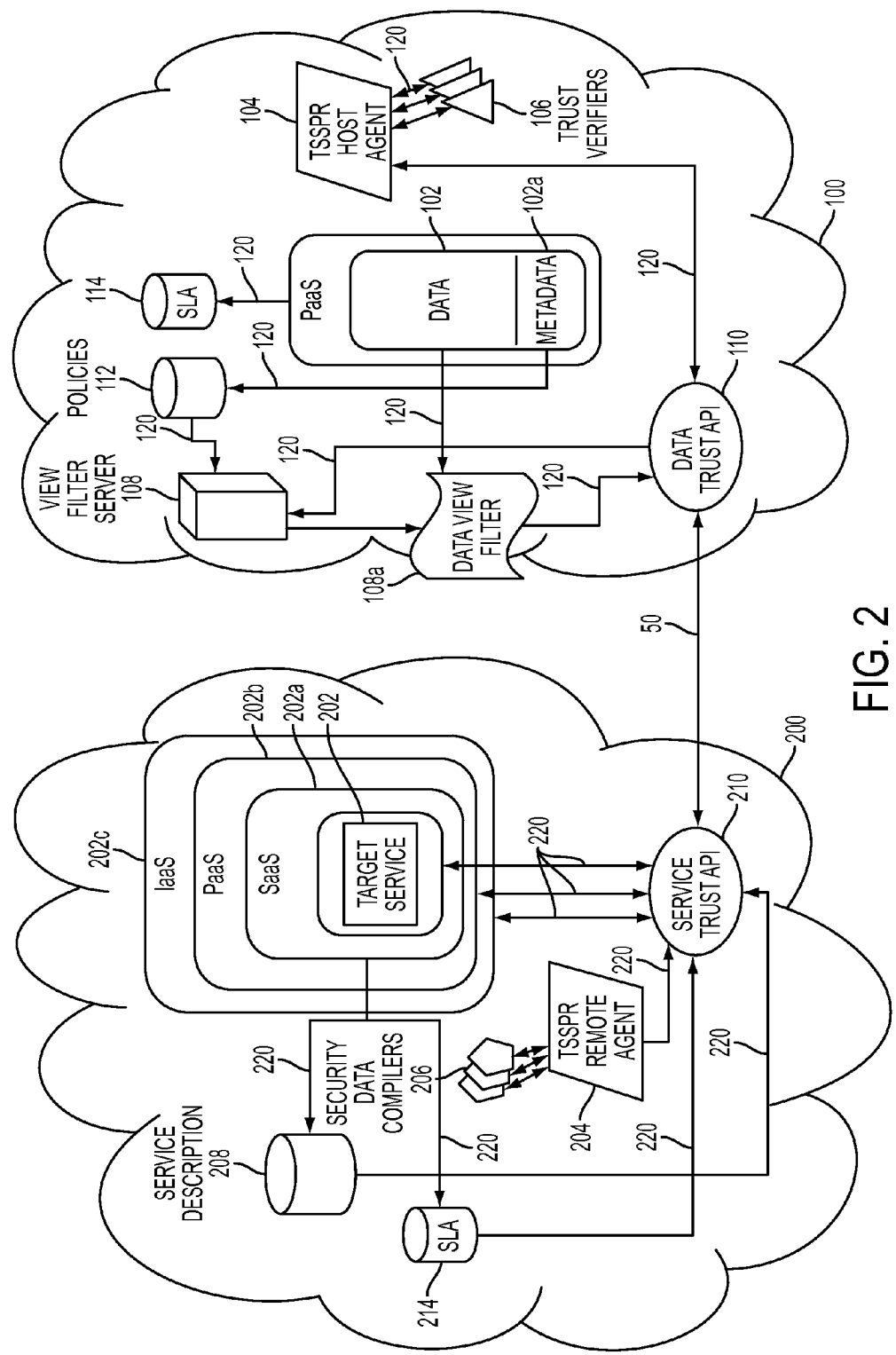
FIG. 2 illustrates a more detailed diagram of the cloud computing system shown in FIG. 1.

FIG. 2 illustrates a detailed diagram of the cloud computing system shown in FIG. 1. As shown in FIG. 2, the data cloud 100 includes a data server 102, a target system security posture retrieval (TSSPR) host agent (HA) 104, trust verifiers 106, a view filter server 108, a data trust application programming interface (API) 110, a policy database 112, a service level agreement (SLA) database 114, and a plurality of connections 120 which connect the various components within the data cloud 100.

The data server 102 is configured to store data of the cloud customer 20. The data server 102 can be implemented in various ways, such as, for example, as a plurality of memory devices. Many different types of information may be stored in the data server 102. For example, when the cloud customer 20 is a health insurance company, the data server 102 may be utilized to store and maintain medical records of customers insured by the health insurance company.

Additionally, in an exemplary embodiment, the data server 102 stores metadata 102a, which is data related to the stored data of the cloud customer 20. In an exemplary embodiment, the metadata 102a indicates a policy or group of policies which the stored data corresponding to the metadata is required to comply with. The stored data may be required to comply with different types of policies. Certain types of data are very sensitive and may be legally required to comply with specific policies. For example, the medical record of a patient is very sensitive information and may be required to comply with certain medical regulations, such as the Health Insurance Portability and Accountability Act of 1996 (hereinafter, also referred to as "HIPAA"). HIPAA regulates various aspects of medical records, including, for example, whether and to what extent certain types of external entities may be granted access to a patient's medical records. Therefore, when, for example, the cloud customer 20 is a health insurance company and stores medical records of patients insured by the health insurance company, the metadata corresponding to the stored data indicates that the stored data includes medical records and further indicates that the medical requires must comply with HIPAA.

The data trust API 110 serves as an interface for communication between the data cloud 100 and the service trust API 210 residing in the service cloud 200. In an exemplary embodiment, the data trust API 110 includes modular pieces of software which contain the logic for establishing intra and inter-cloud communications. The data trust API 110 may further include various pieces of hardware, such as processors, to execute the modular pieces of software. The data trust API 110 is configured to control various processes within the data cloud 100 by directly or indirectly initiating various components of the data cloud 100.

The data trust API 110 is configured to exchange messages with the service trust API 110 in the service cloud 200 to obtain service description information describing the target service 202. The data Trust API 110 is further configured to exchange messages with the TSSPR HA 104 to determine the security parameters (also referred to as "trust information") required to perform the trust assessment of the target service 202. In an exemplary embodiment, this process of identification of security parameters is carried out with respect to the different layers including the IaaS, PaaS and SaaS layers in the service cloud 200.

According to exemplary embodiments, the data trust API 110 may be implemented as either a layered trust API or a non-layered trust API. For example, the data trust API 110 can be implemented as a layered trust API having three layers which correspond to the software as a service (SaaS) layer, platform as a service (PaaS) layer, and infrastructure as a service (IaaS) layer, respectively. The layers are used to classify security parameters required for trust evaluation from SaaS, PaaS and IaaS service providers for making a trust assessment of the target service 202. The data trust API 110 may send a consolidated list of security parameters that the data trust API 110 requires to the service trust API 210. Alternatively, the list of security parameters that the data trust API 110 requests from the service trust API 210 may include a subset of the IaaS, PaaS and/or SaaS service framework components.

The TSSPR HA 104 identifies security parameters for trust evaluation of the target service 202 and assists in the process of trust assessment by invoking the trust verifiers 106.

The TSSPR HA 104 may use several different methods to determine which security parameters to request from the target service 202. For example, specific legal, regulatory and other enterprise or user policies may be associated with corresponding security parameters. In this case, after analyzing the data requested by the target service 202 (or the metadata associated with the data), if the TSSPR HA 104 determines that the provision of the requested data needs to comply with specific legal, regulatory and other enterprise or user policies, the TSSPR HA 104 can then determine the corresponding security parameters to be requested from the target service 202. Alternatively, varying security levels of data (e.g., confidential, secret, top secret, etc.) may be associated with corresponding security parameters. In this case, after determining the security level of the data, the TSSPR HA 104 can then determine the corresponding security parameters to be requested from target service 202. Many other types of correspondences are also possible. The correspondences between security parameters and other criteria (e.g., policies, security levels, etc.) may be stored in the TSSPR HA 104 or in another database.

For example, when the target service 202 requests medical records from the data server 202, the TSSPR HA 104 may determine, based on specific policies (e.g. HIPAA), that the following security parameters are to be requested from the target service 202: hardware configuration information; server information on which the SaaS is hosted; operating system integrity; software version; anti-virus software and version; security patch updates information; networking information; and storage information. Furthermore, the security parameters that are identified by the TSSPR HA 104 may be categorized into parameters of Iaas, PaaS and SaaS layers by the data trust API 110. In this case, the data trust API 110 classifies hardware configuration information, server information on which the SaaS is hosted, networking information, and storage information as IaaS layer security parameters, classifies operating system integrity and anti-virus software and version as PaaS layer security parameters, and classifies software version and security patch updates information as SaaS layer information. After classifying the security parameters by layer, the data trust API 110 transmits a request to the service trust API 210 requesting the security parameters and requesting the initiation of specific security data compilation processes.

The TSSPR HA 104 is able to make a decision about the security posture of the target service 102 based on the results of the verification process which are obtained from the trust verifiers 106. This decision (also referred to as a "trust assessment") determines whether the data transfer will continue or cease. If the decision is positive, then the process of view filter creation is initiated by the data trust API 110 by sending the trust assessment results, service description and pointers to the requested data to the view filter server 108.

The trust verifiers 106 are responsible for performing the trust assessment of the service cloud 200 using trust information transmitted from the service cloud 200 and inputted to the trust verifiers 106 from the TSSPR HA 104. In an exemplary embodiment, the trust verifiers 106 perform verification processes of specific security-related information with respect to different layers of the service cloud 200, for example, the platform as a service (PaaS) layer, the infrastructure as a service (IaaS) layer, and the software as a service (SaaS) layer. Each of these layers may include different types of information, although it is understood that certain types of information may overlap between layers.

For example, one of the trust verifiers 106 may be configured to perform trust verification with respect to security parameters classified in the infrastructure as a service (IaaS) layer, and may verify security-related information related to various IaaS layer parameters, such as, for example, hardware configuration information, server information, networking information, or storage information.

Further, the trust verifiers 106 may perform verification processes with respect to platform as a service (PaaS) layer specific security information of the service cloud 200. The PaaS layer specific security information may include, for example, information related to antivirus/Intrusion Detection System (IDS)/firewalls of the service cloud 200. For example, a trust verifier 106 may check the 'last updated' date of the reported antivirus definitions and check the antivirus tool report for any unwanted content (e.g. whether malware has been identified).

The PaaS layer specific security information may include, for example, information related to antivirus/Intrusion Detection System (IDS)/firewalls of the service cloud 200. For example, a trust verifier 106 may check the 'last updated' date of the reported antivirus definitions and check the antivirus tool report for any unwanted content (e.g. whether malware has been identified).

The trust verifiers 106 may further perform log file checking. The log files of the service cloud 200 may contain two different kinds of information: access logs, showing which users have accessed systems, files and processes of the service cloud 200, and program launch and status logs, which contain information about programs and applications running on the service cloud 200. These log files are example of SaaS layer security information. In the case of static platform configuration information reporting (e.g. hardware components, interfaces, connections, bandwidth and storage capabilities), log file checking can also cover IaaS layer related information.

These two types of information (access logs and program launch and status logs) may be evaluated by a trust verifier 106. For access log files, the trust verifier 106 checks that each access to databases has been authenticated and authorized, so that an audit trail can be generated.

For program status and launch log files, the trust verifier 106 verifies if the software is updated to a safe version. The trust verifier 106 may perform this verification in several ways. For example, the trust verifier 106 may be able to query the available databases and/or other information sources which include information related to known vulnerabilities, such as the CVE (Common Vulnerabilities and Exposures) database, NVD (National Vulnerabilities Database), US-CERT alerts, and OSVDB (Open Source Vulnerability Database). If any of the software packages reported as being used by the service cloud 200 are identified by the databases/information sources as having an active or unpatched vulnerability or exploit, the target service 202 should be considered untrustworthy and data should not be sent to the target service 202. The trust verifier 106 may further keep track of the reported software versions, check the vulnerability databases/information sources on a regular basis, and alert the cloud consumer 200 if any of the previously reported software packages indicates a vulnerability.

The trust verifiers 106 may also perform continuous log file monitoring. In this case, a trust verifier 106 may be configured to continuously monitor log file changes for a predetermined time period after the data has been transmitted to the service cloud 200. This feature enables the trust verifier 106 to continuously obtain an up-to-date view of the system log files of the service cloud 200. This may, for example, be performed by the service cloud 200 sending notification updates to the data cloud 100, the notification updates indicating log file changes. Continuous monitoring verification of log files enables the data cloud 100 to quickly react to uncommon behavior patterns in access logs or to software changes in software logs. According to exemplary embodiments, information is either posted from the service cloud 200 to the trust verifiers 106 or pulled by the trust verifiers 106 from a service cloud log information endpoint.

The trust verifiers 106 may also perform platform and operating system (OS) trust state reporting and evaluation. In an exemplary embodiment, the platform and operating system trust state reporting and evaluation procedure performed by the trust verifiers 106 is similar to the Trusted Computing Group™ system remote attestation methods. In this case, a trust verifier 106 may verify all of the IaaS layer specific security posture information, such as hardware configuration information, server information, networking information, storage information, etc., and may build a base for elevating the level of trust that can be gained from other security posture information (for example, the trustworthiness of logfile information may be higher on a trusted and attested PaaS).

Therefore, according to exemplary embodiments, the verification system is built in a modular way, so that there can be separate modules (trust verifiers 106) which perform the verification for each data type. This extensible architecture allows a user to plug in different trust verifiers 106 as needed. In an exemplary embodiment, the results of a trust verifier 106 may either be a binary result (passed, failed) for binary decisions, or a more detailed return value indicating: 1) a need for additional security posture data, 2) missing verification information, 3) other errors in trust verification which need attention 4) or provide additional inputs to the filtering process for the creation of filters.

The view filter server 108 performs functions of filtering data stored in the data server 102 and providing the filtered data to the data trust API 110 to enable the data trust API 110 to deliver the filtered data to the target service 202. The view filter server 108 generates at least one data view filter 108a (also referred to as a "filter rule") based on various types of information, and uses the data view filter 108a to filter the data stored in the data server 102. In an exemplary embodiment, the view filter server 108 filters the data in order to ensure that only a minimally necessary quantity of data is sent from the data cloud 100 to the service cloud 200.

Based on the result of the trust assessment, the view filter server 108 receives a command from the data trust API 110 to start the creation of the filter rule 108a. The view filter server 108 generates the filter rule 108a based on various criteria, including, for example, the service description information describing the target service 202, the trust assessment results determined by the trust verifiers 106, and the policies which are indicated by the metadata 102b. The view filter server 108 fetches the requested data and the corresponding metadata from the data server 102. Then the view filter server 108 dynamically generates the filter rules 108a based on inputs provided by the data trust API 110. In an exemplary embodiment, the view filter server 108 may also generate additional rules obtained as a result of mapping the metadata 102a of the requested data to the policy database 112.

In an exemplary embodiment, the view filter server 108 generates the filter rules 108a by combining basic atomic filters with categorized filters. Examples of basic atomic filters include REMOVE, ADD and REPLACE, which, for example, remove, add and replace the name of a person in a data record, respectively. Examples of categorized filters are filters which are specific to certain policies that are associated with the data. Additional new filter rules can also be generated in combination with the atomic filters based on the inputs for the view filter function. For example, this may be information for the required data from the service description.

For example, the view filter server 108 may generate a filter rule based on service description information describing the target service 202. For example, the cloud customer 20 may be a health insurance company which desires to obtain a statistical analysis provided by the target service 202, e.g., statistics on the number of patients who have undergone surgeries. In this case, the target service 202 may request that the data cloud 100 provides the health records of all the insurance customers. However, from the service description information, the view filter server 108 determines that, in order to perform the desired service, the target service 202 only needs the medical records of the sub-set of insurance customers who have made visits to a hospital and may filter out all other medical records. Therefore, the view filter server 108 generates an initial set of filter rules (e.g., filter rules removing the insurance customers who have not made visits to a hospital) based on the service description information describing the target service 202.

Furthermore, the view filter server 108 may generate the filter rule based on policies stored in the policy database 112. For example, health records about patients are very sensitive information, and such data may be associated with certain metadata which specifies the policies to which such data set is required to comply with. For example, the metadata may indicate that the data must comply with HIPAA. So this information from the metadata is mapped to the policy 112 database and all the underlying sub-policies associated with HIPAA are retrieved. For example, a HIPAA sub-policy may require that the first, middle and last names of the patients must be removed before the health records are provided to another party (e.g., target service 202). These policy based filters are the categorized filters. Once the relevant policies and the associated rules are retrieved, the basic filter rules are customized as required and thus form the final set of filter rules 108a to filter the data.

The policy database 112 is a database configured to store policies which may be used to filter the data stored in the data server 102 before the data is transmitted to the target service 202. The policies may be many different kinds, including legislative and regulatory compliance policies and associated sub-policies, user policies, etc. In an exemplary embodiment, the policies and sub-policies stored in the policy database 112 are matched to metadata associated with the data requested by the target service 202. The view filter server 108 generates filter rules based on a result of the policy-metadata matching operation. For example, when the metadata indicates that the stored data includes medical records required to comply with HIPAA, the policy database 112 matches the metadata with the specific policies/sub-policies of HIPAA which are stored in the policy database 112.

The service level agreement (SLA) database 114 stores SLAs established between the data cloud 100 and other entities, such as an SLA formed between the cloud customer 20 and the data cloud 100. According to exemplary embodiments, there are various service level agreement standards that may be implemented and stored in the SLA database 114. For example, the Web Service Agreement (WS-Agreement) from the Open Grid Framework, Web Service Level Agreement (WSLA) language and framework from IBM and Unified Service Description from World Wide Web Consortium are the major standards to consider for SLAs related to web services. The WS-Agreement and WSLA can be used in coordination with WSDL, which may also be used as one of the possible standards for the service description specification, whereas the USDL may combine the specifications of service descriptions and the SLA. All of these standards may use XML for the specification, although are not limited thereto.

The connections 120 which connect the various components residing in the data cloud 100 can be various types of wired and/or wireless connections, such as connections over the Internet, Local Area Network (LAN) connections, ethernet, a combination thereof, etc. The connections 120 are not limited to being implemented as shown in FIG. 2.

As shown in FIG. 2, the service cloud 200 includes a target service 202, a target system security posture retrieval (TSSPR) remote agent (RA) 204, security data compilers 206, a service description database 208, a service trust application programming interface (API) 210, a service level agreement (SLA) database 214, and a plurality of connections 220 which connect the various components within the service cloud 200.

The target service 202 is a service which is desired to be used by the cloud customer 20. In an exemplary embodiment, the target service 202 is an SaaS layer service. The target service 202 performs a service on the data owned by the cloud customer 20 which is stored in the data server 102 and outputs a result of the performance to the cloud customer 20. The target service 202 can be a very wide variety of different types of services, and may be either a single service or a plurality of services. The target service 202 may be, for example, a statistical analysis service which generates a statistical analysis of data, may be a data searching service which searches data based on specific criteria, etc. For example, when the cloud customer 20 is a health insurance company, the target service 202 may be a statistical analysis service which analyzes certain types of information related to the medical records of people insured by the health insurance company, e.g., the number of patients undergoing surgeries, the number of patients visiting a dentist, etc.

The service trust API 210 serves as an interface for communication between the service cloud 200 and the data trust API 110 residing in the data cloud 100. The service trust API 210 responds to the requests transmitted from the data trust API 110 by triggering the functions among the various components in the service cloud 200, and then relays the requested information to the data trust API 110. The service trust API 210 consolidates the trust information to be sent to the data trust API 110. Furthermore, optionally, the service trust API 210 may translate the trust information to another format. For example, in an exemplary embodiment, the service trust API 210 converts the trust information into XML data, and transmits the converted trust information to the data trust API 110.

Based on the identified security parameters, the service trust API 210 resolves any issues in the gathering of security information from different layers. For example, the service cloud 200 may utilize different SaaS, PaaS and IaaS providers, in which case the SLAs between the different providers may be used to respond to the requests for security parameter information appropriately. After having resolved the issues, the service trust API 210 instructs the TSSPR RA 204 to request initiation of the security data compilers 206 to gather all the required security parameters.

According to exemplary embodiments, the service trust API 210 may be implemented as either a layered trust API or a non-layered trust API. For example, as shown in FIG. 2, the service trust API 210 can be implemented as a layered trust API having three layers 210a, 210b and 210c which correspond to the software as a service (SaaS) layer, platform as a service (PaaS) layer, and infrastructure as a service (IaaS) layer, respectively. The layers 210a, 210b and 210c each include security parameters required for trust evaluation. The service trust API 210 may receive a consolidated list of security parameters requested from the data trust API 110. Alternatively, the list of security parameters requested from the data trust API 110 may include a subset of the SaaS, PaaS and IaaS layers 210a, 210b and 210c.

In an exemplary embodiment, the service trust API 210 is owned by an SaaS provider. This SaaS provider may also own the underlying PaaS and IaaS services, in which case all the necessary security parameters can be easily measured. If the PaaS and IaaS services belong to another provider or a plurality of other providers, then the SaaS provider may enter an SLA or a plurality of SLAs with the other provider or the plurality of the other providers to define the limitations of the information that the SaaS provider can access from the underlying PaaS or IaaS providers.

The target system security posture retrieval (TSSPR) remote agent (RA) 204 is responsible for initiating and consolidating security parameter information in the service cloud 200. Specifically, the TS SPR RA 204 receives a request for security parameter information, and based on the received security parameter information, the TSSPR RA 204 initiates the security data compilers 206 to begin the process of compiling the requested security information.

Each of the security data compilers 206 is responsible for retrieval of specific security related information of the service cloud 200. The security data compilers 206 may retrieve the security information in a layer-by-layer manner.

In an exemplary embodiment, security related information may be collected by the security data compilers 206 on a hardware level by using trusted computing technology such as, for example, a Trusted Platform module (TPM), a virtual TPM (vTPM), Trustzone enabled hardware, or other security anchors which are able to measure and securely store platform configuration information.

A typical process of gathering security related information by the security data compilers 206 may include, for example, the creation of a chain of trust by measuring, using a calculation of a hash value, each hardware and software component before its start up. The measured data is then stored securely in secured storage of the security anchor. If the secure storage is limited, technology such as, for example, an 'extend' operation used in the TPM Platform configuration registers may additionally be used. In this case, measurements are cryptographically bound and collated into a single hash value by calculating the new value of a secure storage register as new_val=hash(old_val||hash(file)), where hash is a hash function such as SHA1, old_val refers to the old value in the storage register, file refers to the actual file to be executed or measured and '|' is the concatenation of the values. A measurement log file is created alongside this operation which contains the clear text representation of each measurement value, the corresponding filename and the register in which the measurement value is stored. The measurement process results in a structured and cryptographically secured representation of the machine state, where the clear text log is protected by the secured value in the security anchor. The information may then be sent to the trust verifiers 106, which in turn may use the clear text log to re-calculate the values of the storage registers from the clear text log and compare the result with the cryptographically protected reported value form the security anchor. If the values do not match, the trust verifier 106 determines that the clear text log has been tampered with and determines that the service cloud 200 is untrustworthy. The trust verifiers 106 may also check the clear text log with the help of an appropriate service or database of reference measurement values for files which have a different hash measurement value reported from the expected value which is in the database of known good values. As a result, the trust verifiers 106 have a specific, detailed and trusted view on the software and hardware configuration of the target service under evaluation. It is understood that this description is exemplary only.

The service description database 208 stores information describing the functionality of services offered by the target service 202. In an exemplary embodiment, the services offered by the target service 202 are web-based services. In this case, the target service 202 is configured to be compatible with Web Services Description Language (WSDL). WSDL is the standard format for describing a web service in Extensible Markup Language (XML) format. A WSDL description of a web service (also referred to as a WSDL file) provides a machine-readable description of what the target service 202 is called, what parameters are expected by the target service 202, and what data structures the target service 202 returns.

According to exemplary embodiments, WSDL may be used in combination with SOAP and XML Schema to provide web services over the Internet. A client program connecting to a web service can read the WSDL to determine what functions are available from the target service 202. Any special datatypes used are embedded in the WSDL file in the form of XML Schema. The client can then use SOAP to actually call one of the functions listed in the WSDL.

According to an exemplary embodiment, WSDL 2.0 may be used for the service description. WSDL 2.0 is a W3C recommendation for specifying service descriptions for web services. According to other exemplary embodiments, the Unified Service Description Language (USDL) may be used for the service description, as the USDL is a comprehensive language in terms of describing business, operational and technical parameters of services and therefore may be beneficial for cloud computing scenarios. In USDL, service descriptions may include information such as, for example, pricing, legal notices, service providers, interaction methods, service level agreements and so on. USDL may further allow for comparison of services by price.

The service level agreement (SLA) database 214 stores the SLAs formed between the service cloud 200 and other entities, such as the SLA formed between the service cloud 200 and the cloud customer 20. The SLA database 214 may also store other SLAs as well. For example, when the PaaS and IaaS services are owned/operated by other providers, the SLA database 214 may store the SLAs with these other providers.

The connections 220 which connect the various components residing in the service cloud 100 can be various types of wired and/or wireless connections, such as connections over the Internet, Local Area Network (LAN) connections, ethernet, a combination thereof, etc.

According to exemplary embodiments, each member entity of the transit control framework may be equipped with a private/public key pair, which is used as authentication keying material. When two entities need to communicate and exchange data, e.g. in the discovery of communication endpoints, in data requests and responses, etc., the entities may perform a TLS authentication handshake based on their key pairs. Communication security may be provided by session keys established during the TLS handshake, and message integrity can be generated by the use of message authentication codes (MACs).

According to exemplary embodiments, for two member entities of the transit control framework to discover endpoints, RFC5785-based Uniform Resource Identifiers (URI) are used.

Figure 3:
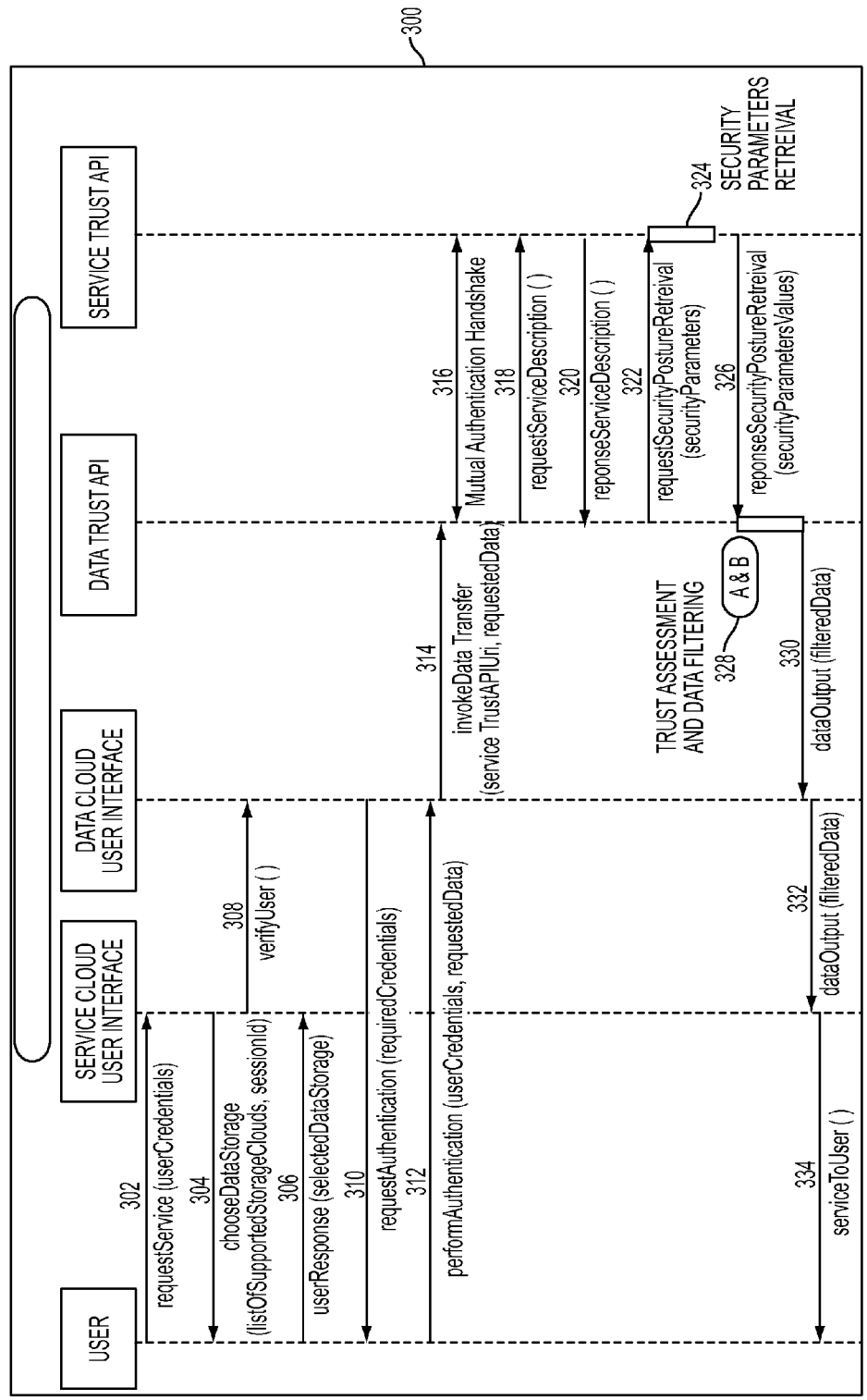
FIG. 3 illustrates a method and an algorithm of inter-cloud data transfer according to an exemplary embodiment.

FIG. 3 illustrates a method of inter-cloud data transfer according to an exemplary embodiment. In the following description of the method 300 shown in FIG. 3, various entities described in connection with FIG. 2 are identified. However, it is understood that this description is exemplary only, and that the method 300 shown in FIG. 3 is not limited to being performed by the entities described in connection with FIG. 2. The method 300 shown in FIG. 3 may alternatively be performed by many other types of entities according to other exemplary embodiments.

In operation 302, the cloud consumer 20 requests a service from the service cloud 200. In an exemplary embodiment, the cloud consumer 20 requests the service over an Internet connection by using a user interface (e.g., a website) provided by the service cloud 200. For example, when the cloud consumer 20 is a health insurance company, the health insurance company may wish to request that the service cloud 200 perform a service which identifies each of the health insurance company's customers who have undergone surgery during the past year. As part of operation 302, the service cloud 200 authenticates the identity of the cloud consumer 20 using any of various authentication techniques (e.g., passwords, tokens, etc.).

In operation 304, the service cloud 200 provides the cloud consumer 20 with a list of data clouds 100 supported by the service cloud 200 to enable the cloud customer 20 to select the data cloud 100 which hosts the cloud consumer's data from among the list of data clouds 100. As part of operation 304, the service cloud 200 also requests the data required to perform the service initially requested by the cloud consumer 20. For example, the service cloud 200 requests the medical records of the health insurance company.

In operation 306, the cloud consumer 20 selects the data cloud 100 which hosts the data of the cloud consumer 20.

In operation 308, the service cloud 200 transfers control from the user interface of the service cloud 200 to the user interface of the data cloud 100 selected in operation 306 to enable the cloud consumer 20 to authenticate itself to the selected data cloud 100.

In operation 310, the data cloud 100 provides an interface for authentication to the cloud consumer 20.

In operation 312, the cloud consumer 20 authenticates itself using the interface provided by the data cloud 100 in operation 310. Furthermore, in operation 312, the cloud consumer 20 selects the data requested by the service cloud 200.

In operation 314, the data cloud 100 transfers control from the user interface of the data cloud 100 to the data trust API 110 to invoke the transfer of the cloud customer's records to the service cloud 200 and also provides the URI of the service cloud 200.

In operation 316, the data trust API 110 and the service trust API 210 mutually authenticate each other in order to ensure the secure exchange of sensitive trust information.

In operation 318, the data trust API 110 requests the service description information describing the service requested by the cloud customer 20 from the service trust API 210.

In operation 320, the service trust API 210 initiates the retrieval of the service description information requested in operation 318 and then transmits the retrieved service description information to the data trust API 110.

In operation 322, the data trust API 110 invokes processes to identify security parameters required for the trust evaluation of the service provided by the service cloud 200.

In operation 324, the service trust API 210 invokes processes to retrieve the security parameters requested in operation 322.

In operation 326, once the requested parameters are retrieved, the service trust API 210 transmits the requested parameters to the data trust API 210.

In operation 328, the data trust API 210 starts the process of trust assessment and then initiates a data filtering process based on the trust assessment having a positive result.

In operation 330, the data trust API 210 transmits the filtered data to the user interface of the data cloud 100. In operation 332, the user interface of the data cloud 100 transmits the filtered data to the service cloud 200 and the service cloud 200 performs the desired service using the filtered data.

In operation 334, the user interface of the service cloud 200 outputs a result of the service to the cloud customer 20. For example, the service cloud 200 outputs a statistical analysis of patients who have undergone surgery during the past year.

Figure 4:
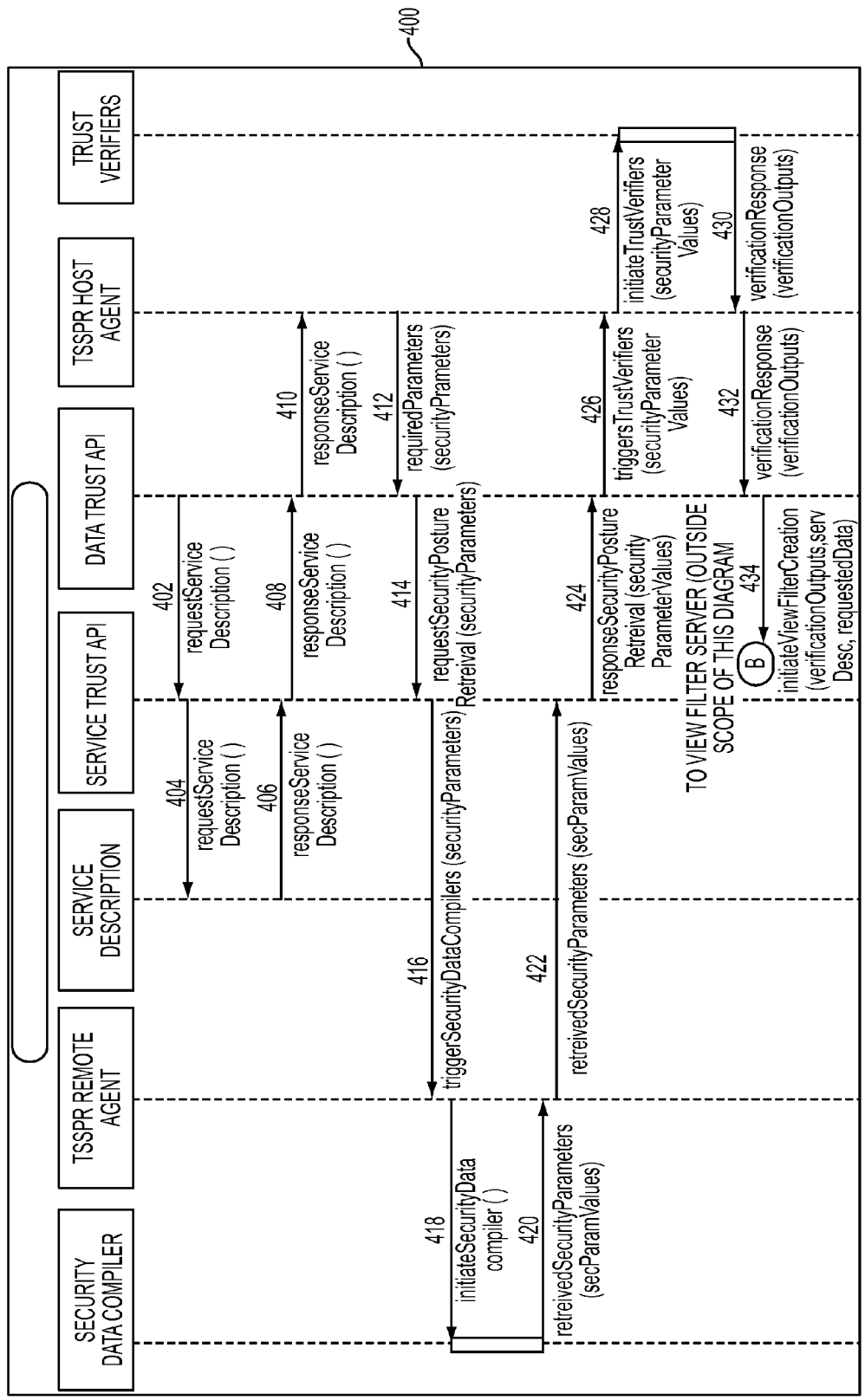
FIG. 4 illustrates a method and an algorithm of performing a trust assessment process according to an exemplary embodiment.

FIG. 4 illustrates a method of performing a trust assessment process according to an exemplary embodiment. In the following description of the method 400 shown in FIG. 4, various entities described in connection with FIG. 2 are described as performing operations in the method of FIG. 4. However, it is understood that this description is exemplary only, and that the method 400 shown in FIG. 4 is not limited to being performed by the entities described in connection with FIG. 2. The method 400 shown in FIG. 4 may alternatively be performed by many other types of entities according to other exemplary embodiments.

According to an exemplary embodiment, the method 400 shown in FIG. 4 is a more detailed description of the operations 318, 320, 322, 324, 326 and 328 shown in the method 300 of FIG. 3. However, it is understood that the method 400 shown in FIG. 4 is not required to be implemented as part of the method 300 shown in FIG. 3, and may alternatively be implemented independently from the method 300 shown in FIG. 3.

In operation 402, the data trust API 110 requests service description information from the service trust API 210. For example, when the cloud consumer 20 is a health insurance company, the health insurance company may wish to request that the service cloud 200 perform a service which identifies each of the health insurance company's customers who have undergone surgery during the past year.

In operation 404, the service trust API 210 requests the service description information from the service description database 208.

In operation 406, the service description database 208 retrieves the service description information requested in operation 404 and transmits the service description information to the service trust API 210.

In operation 408, the service trust API 210 transmits the service description information to the data trust API 110.

In operation 410, the data trust API 110 transmits the service description information to the TSSPR HA 104, and then the TSSPR HA 104 analyzes the service description information to identify security parameters necessary to perform the trust assessment of the target service 202 based on the service description information.

In operation 412, the TSSPR HA 104 transmits the security parameters identified in operation 410 to the data trust API 110. In an exemplary embodiment, operation 412 includes an operation of the TSSPR HA 104 classifying the security parameters transmitted from the TSSPR HA 104 on a layer-by-layer basis, such as, for example, the IaaS, PaaS, and SaaS layers.

In operation 414, the data trust API 110 transmits a request to the service trust API 210 requesting the security parameters sent from the TSSPR HA 104 in operation 412.

In operation 416, the service trust API 210 transmits a request to the TSSPR remote agent 204 to initiate processes to retrieve the information related to the security parameters requested in operation 414.

In operation 418, the TSSPR remote agent 204 initiates the security data compilers 206, which are configured to compile information related to the security parameters requested in operation 414. In an exemplary embodiment, each of the security data compilers 206 compiles security parameter information corresponding to a different layer, for example, the IaaS, PaaS, and SaaS layers.

In operation 420, the security data compilers 206 transmit the compiled security parameter information to the TSSPR remote agent 204.

In operation 422, the TSSPR remote agent 204 consolidates the compiled security parameter information and transmits the consolidated security parameter information to the service trust API 210.

In operation 424, the service trust API 210 transmits the security parameter information received in operation 422 to the data trust API 110.

In operation 426, the data trust API 110 transmits the security parameter information received in operation 424 to the TSSPR HA 104.

In operation 428, the TSSPR HA 104 transmits the security parameter information received in operation 426 to the trust verifiers 106, and then the trust verifiers 106 perform verification processes based on the security parameter information.

In operation 430, the trust verifiers 106 transmit a verification response based on the result of the verification processes to the TSSPR HA 104, and based on the verification response, the TSSPR HA 104 makes a decision as to the security posture of the target service 202. The decision indicates whether the TSSPR HA 104 has determined that the target service 202 is trustworthy and therefore determines the sequence of steps that follow operation 430. If the decision indicates that the target service 202 is trustworthy, the method moves to operation 432.

In operation 432, the TSSPR HA 104 transmits the decision to the data trust API 110, and then, in operation 434, the data trust API 110 communicates with the view filter server 108 to initiate the creation of view filter rules to filter the data to be transmitted to the target service 202.

Figure 5:
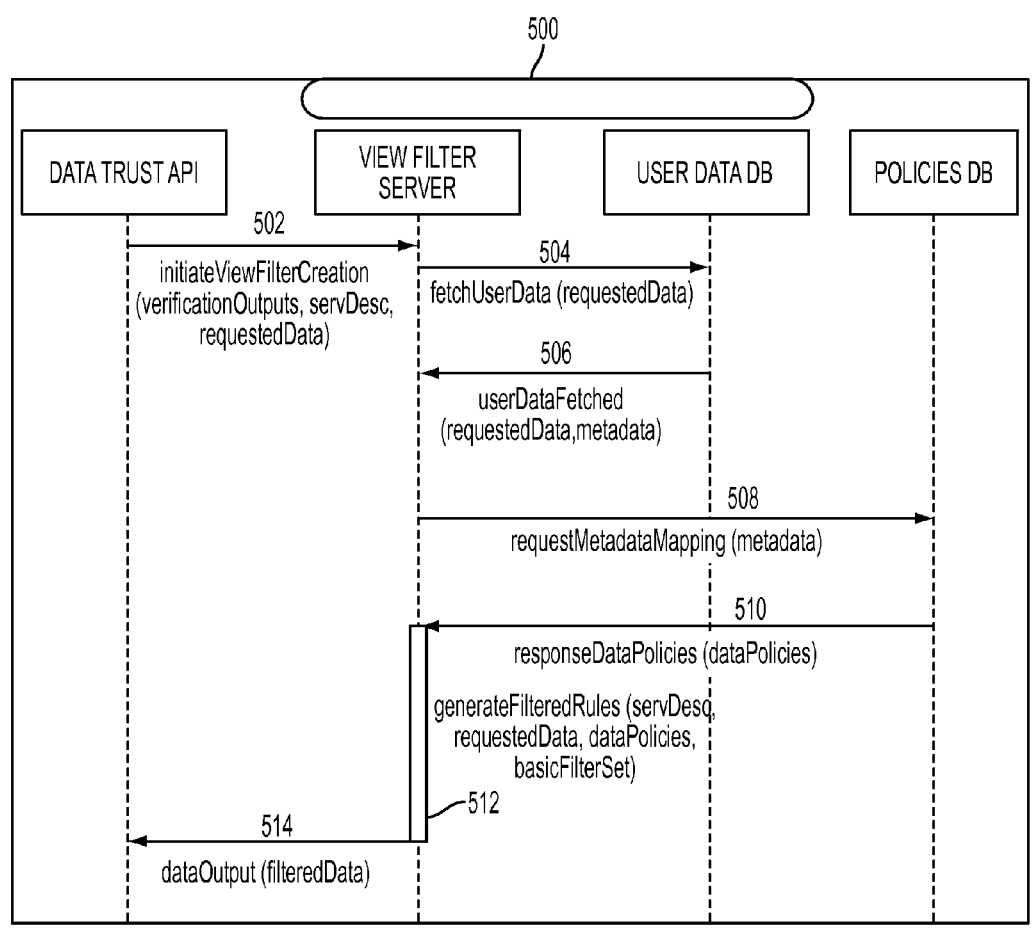
FIG. 5 illustrates a method and an algorithm of creating a view filter rule according to an exemplary embodiment.

FIG. 5 illustrates a method of creating a view filter rule according to an exemplary embodiment. In the following description of FIG. 5, various entities described in connection with FIG. 2 are described as performing operations in the method 500 shown in FIG. 5. However, it is understood that this description is exemplary only, and that the method 500 shown in FIG. 5 is not limited to being performed by the entities described in connection with FIG. 2. The method 500 shown in FIG. 5 may alternatively be performed by many other types of entities according to other exemplary embodiments.

According to an exemplary embodiment, the method 500 shown in FIG. 5 is a more detailed description of the operation 328 shown in FIG. 3. However, it is understood that the method 500 shown in FIG. 5 is not required to be implemented as part of the method 300 shown in FIG. 3, and may alternatively be implemented independently from the method 300 shown in FIG. 3.

In response to receiving a decision from the TSSPR HA 104 indicating that the target service 202 is trustworthy, in operation 502, the data trust API 110 communicates with the view filter server 108 to initiate the view filter creation process. In an exemplary embodiment, the data trust API 110 initiates the creation of the view filter rules by providing the trust assessment outputs, service description information, and a pointer to the requested data, to the view filter server 108.

In operation 504, the view filter server 108 transmits a request to the data server 102 requesting the data requested by the target service 202, and further requests the metadata corresponding to the data requested by the target service 202.

In operation 506, the data server 102 retrieves the data and corresponding metadata requested in operation 504 and transmits the data and corresponding metadata to the view filter server 108.

In operation 508, the view filter server 108 then transmits a request to the policy database 112 requesting that the policy database 112 map the policies specified in the metadata to the policy information stored within the policy database 112. For example, when the metadata indicates that the stored data includes medical records required to comply with HIPAA, the policy database 112 matches the metadata with the specific policies/sub-policies of HIPAA which are stored in the policy database 112. In this case, for example, HIPAA may require that certain information not be disclosed, or be disclosed on a minimal basis.

In operation 510, the policy database 512 transmits the specific policies/sub-policies which match the metadata back to the view filter server 108.

In operation 512, the view filter server 108 generates one or a plurality of data view filters (also referred to as view filter rules) based on the specific policies/sub-policies transmitted from the policy database 512 and the service description information.

In operation 514, the view filter server 108 transmits the filtered data to the data trust API 110, to enable the data trust API 110 to deliver the filtered data to the target service 202. The data trust API 110 may deliver the filtered data to the target service 202 in several ways. For example, the data trust API 110 may directly transmit the filtered data to the target service 202. Alternatively, the data trust API 110 may store the filtered data in a secure storage facility which is accessible via a specified URL, and may provide the target service 202 with access to the stored data by providing the target service 202 with the specified URL. The filtered data from the view filter server 108 can also be transmitted to other entities inside or outside of the data cloud 100 as well as the data trust API 110.

Figure 6:
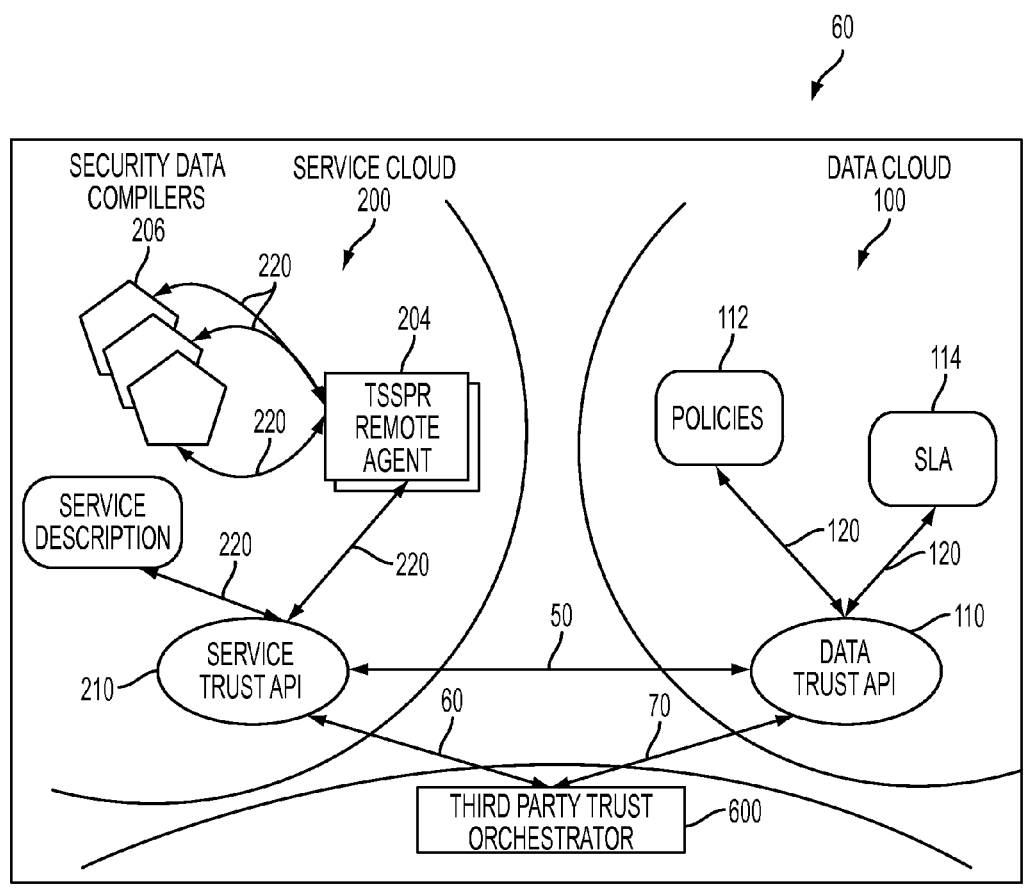
FIG. 6 illustrates a cloud computing system according to another exemplary embodiment.

FIG. 6 illustrates a cloud computing system according to another exemplary embodiment. As shown in FIG. 6, the cloud computing system 60 differs from the cloud computing system 10 shown in FIG. 2 in that the cloud computing system 60 includes a third-party trust orchestrator 600.

The third-party trust orchestrator 600 manages the process of trust verification for the data cloud 100. According to this other exemplary embodiment, the third-party trust orchestrator 600 has SLAs with both the data cloud 100 and the service provider 200. The third-party trust orchestrator 600 may perform all or a sub-set of the trust assessment operations described above with respect to the cloud computing system 10 shown in FIG. 2.

Figure 7:
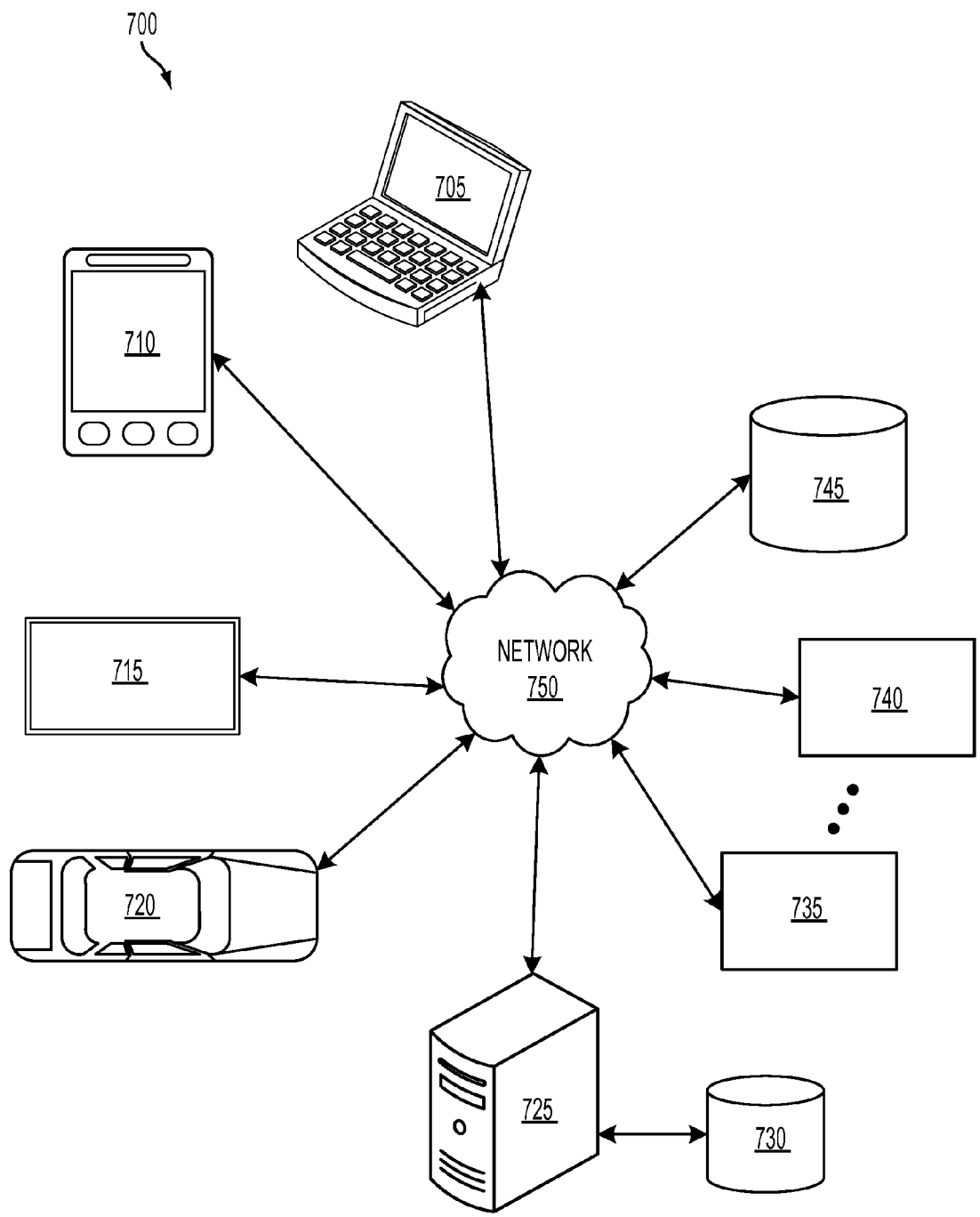
FIG. 7 shows an exemplary embodiment in simplified schematic form.

FIG. 7 shows an example environment suitable for some example implementations. Environment 700 includes devices 705-745, and each is communicatively connected to at least one other device via, for example, network 760 (e.g., by wired and/or wireless connections). Some devices may be communicatively connected to one or more storage devices 730 and 745.

The devices and/or services illustrated in FIGS. 2 and 6, for example, may be concretely implemented using one or more devices of the type shown at 705-745, and may interface with one or more such computing devices. Devices 705-745 may include, but are not limited to, a computer 705 (e.g., a laptop computing device), a mobile device 710 (e.g., smartphone or tablet), a television 715 with one or more processors embedded therein and/or coupled thereto, a device associated with a vehicle 720, a server computer 725, computing devices 735-740, and storage devices 730 (e.g., an attached storage device) and 745 (e.g., a network accessible storage device).

Although the exemplary embodiments mentioned above may appear to focus on services and operations that are today provided by high speed servers, the continuous advances in computing devices are foreseen to make it possible for such services and operations to be carried out between computing devices of types such as devices 705-720 which today are often thought of as user devices (e.g., devices used by users to access services and/or issue requests, such as on a network). Such user devices may provide a source for requests that initiate the need for communication between a data cloud and a service cloud.

Devices 725-745, on the other hand, are certainly appropriate for operations and services mentioned above, but could likewise provide a source for requests that initiate the need for communication between a data cloud and a service cloud. When carrying out the operations and services mentioned above, such devices may be more typically associated with service providers (e.g., used by service providers to provide services and/or store data, and carry out the operations such as those illustrated in FIGS. 3-5).

For example, a user may initiate a request for some type of information, for accessing, viewing, and/or sharing content using user devices 705 or 710. Such a request may travel through network 750 to a server such as devices 725 or 735-740 that support the API 110. The communications described above, such as those illustrated in FIGS. 3-5, may take place between devices such as 735-740. On the other hand, it is not required that the APIs be supported only by devices such as 735-740, and the other devices shown in FIG. 7 may be used as is appropriate to the technical situation.

Figure 8:
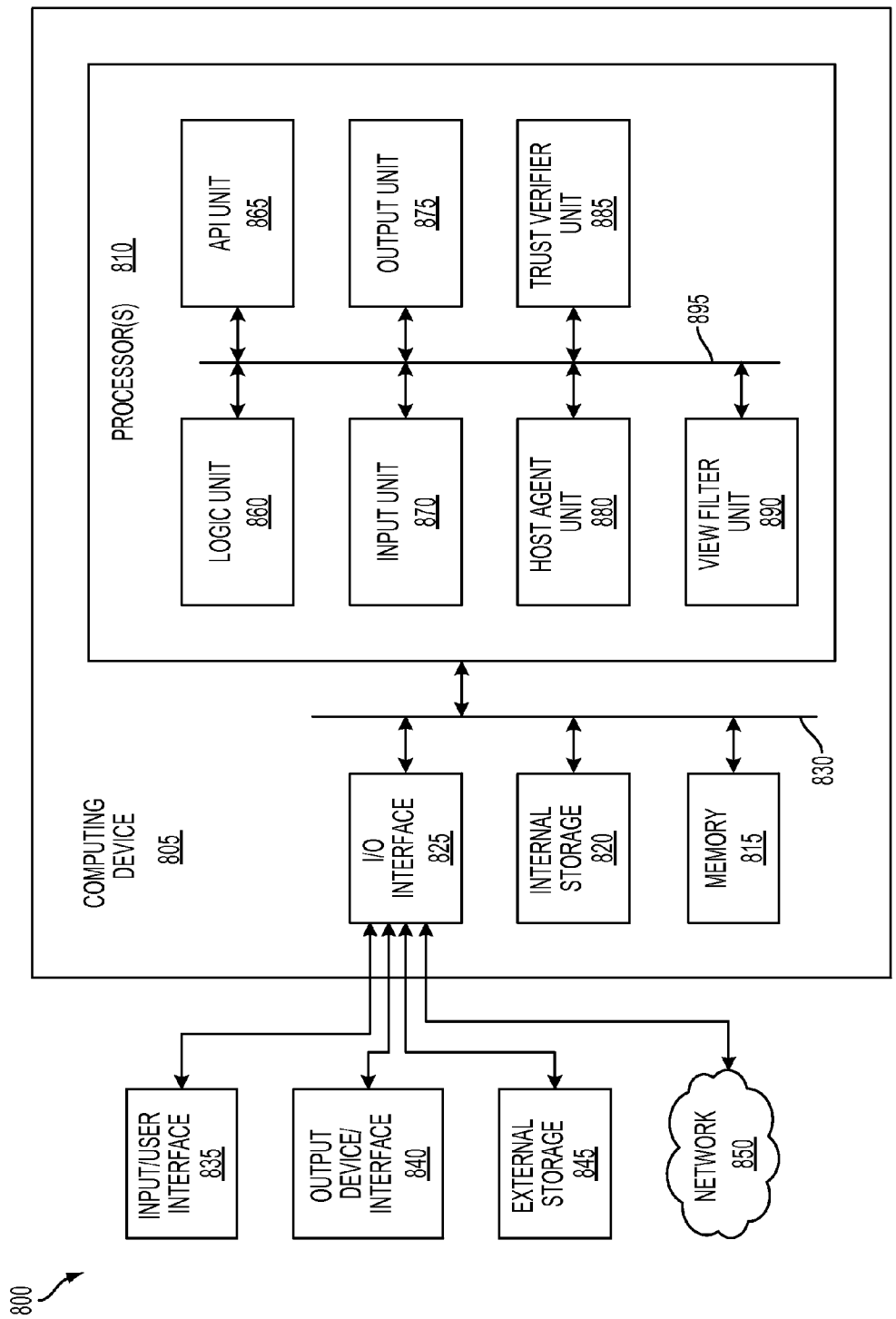
FIG. 8 shows an exemplary embodiment of a concrete implementation in simplified schematic form.

FIG. 8 shows an example computing environment with an example computing device suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers such as servers or rack-mounted devices, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, API unit 865, input unit 870, output unit 875, host agent unit 880, trust verifier unit 885, view filter unit 890, and inter-unit communication mechanism 895 for the different units to communicate with each other, with the OS, and with other applications (not shown). For example, host agent unit 880, trust verifier unit 885, and view filter unit 890 may implement one or more processes shown in the figures described previously. The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875, host agent unit 880, trust verifier unit 885, and view filter unit 890). To carry out such an execution instruction, the processor(s) 810 must refer to a set of instructions stored in internal storage 820, memory 815, or external storage 845, and such a set of instructions are what enables the processor(s) 810 to carry out the operations intended by the information or execution instruction received by API unit 865.

In some instances, logic unit 860 may be configured to control the information flow among the units and direct the services provided by API unit 865, input unit 870, output unit 875, host agent unit 880, trust verifier unit 885, and view filter unit 890 in some example implementations described above. For example, the flow of one or more processes or implementations may be controlled by logic unit 860 alone or in conjunction with API unit 865.

The various units just described may, in some exemplary embodiments, be implemented on the same computing equipment, or different computing equipment, as the technical situation directs.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A method for an apparatus which operates in a data cloud, the method comprising:
    requesting, by the apparatus, trust information from a service cloud;
    receiving, by the apparatus, the trust information from the service cloud;
    performing, by the apparatus, a trust assessment of the service cloud based on the trust information;
    controlling, by the apparatus, transmission of data to the service cloud according to a result of the trust assessment; and
    transmitting, by the apparatus, the data to the service cloud when the result of the trust assessment indicates that the service cloud is trustworthy, the data to be used with a target service provided by the service cloud,
    wherein the data cloud comprises a data trust application programming interface (API), and the requesting of the trust information comprises the data trust API requesting the trust information from a service trust API of the service cloud,
    wherein the method further comprises requesting, by data trust API, the service description information from the service trust API, the service description information describing the target service, and receiving, by the data trust API, the service description information from the service trust API,
    wherein the service trust API retrieves the service description information from a service description database which operates in the service cloud, and
    wherein the method further comprises:
    the data trust API transmitting a request to a Target System Security Posture Retrieval (TSSPR) host agent (HA) which operates in the data cloud to identify a security parameter to be used for performing the trust assessment of the service cloud, the request being based on the service description information.

2. The method of claim 1, wherein the security parameter comprises at least one type of information selected from among information related to an antivirus system implemented by the service cloud, information related to a log file implemented by the service cloud, and information related to at least one of a platform and an operating system (OS) implemented by the service cloud.

3. The method of claim 2, wherein the information related to the platform comprises at least one of information related to hardware configuration information, server information, networking information, and storage information.

4. The method of claim 1, wherein the requesting of the trust information comprises:
    transmitting the security parameter to the service trust API, the security parameter being used by the service trust API to request a TSSPR remote agent (RA) which operates in the service cloud to initiate a security data compiler for gathering information related to the security parameter.

5. The method of claim 4, wherein:
    the receiving of the trust information comprises the data trust API receiving the information related to the security parameter from the service trust API; and
    the performing of the trust assessment comprises the data trust API requesting the TSSPR HA to initiate a trust verifier based on the information related to the security parameter, to thereby start the trust assessment.

6. The method of claim 5, further comprising the data trust API instructing a view filter server residing in the data cloud to create a filter rule when the trust verifier indicates that the service cloud is trustworthy.

7. The method of claim 6, wherein the view filter server dynamically creates the filter rule to filter the data.

8. The method of claim 7, wherein the view filter server creates the filter rule based on information related to a policy.

9. The method of claim 8, further comprising the view filter server obtaining the information related to the policy from a policy database.

10. The method of claim 7, wherein the view filter server creates the filter rule based on metadata associated with the data.

11. The method of claim 6, further comprising:
    filtering the data using the filter rule; and
    directly transmitting the filtered data to the service cloud, the filtered data to be used with the target service of the service cloud.

12. The method of claim 6, further comprising:
    filtering the data using the filter rule; and
    providing a URL to the service cloud to enable the service cloud to access the filtered data via the URL, the filtered data to be used with the target service of the service cloud.

13. The method of claim 6, wherein the view filter server creates a plurality of the filter rules which are a combination of atomic filter rules and categorized filter rules.

14. The method of claim 13, wherein the atomic filter rules comprise ADD, REPLACE, or REMOVE rules which respectively add, replace or remove designated types of information from the data.

15. The method of claim 13, wherein the categorized filter rules are created based on policies.

16. The method of claim 1, wherein the data trust API comprises a plurality of layers, and the method further comprises the data trust API requesting the TSSPR HA to identify a plurality of the security parameters corresponding to the plurality of layers.

17. The method of claim 16, wherein the plurality of layers comprise:
- an infrastructure as a service (IaaS) layer;
- a platform as a service (PaaS) layer; and
- a software as a service (SaaS) layer.

* * * * *